US012484570B2

(12) United States Patent
Stuber et al.

(10) Patent No.: US 12,484,570 B2
(45) Date of Patent: Dec. 2, 2025

(54) AGRICULTURAL SPRAYING SYSTEM

(71) Applicant: Precision Planting LLC, Tremont, IL (US)

(72) Inventors: Luke Stuber, Tremont, IL (US); Jason J. Stoller, Eureka, IL (US)

(73) Assignee: PRECISION PLANTING LLC, Tremont, IL (US)

( * ) Notice: Subject to any disclaimer, the term of this patent is extended or adjusted under 35 U.S.C. 154(b) by 462 days.

(21) Appl. No.: 17/754,253

(22) PCT Filed: Jun. 17, 2020

(86) PCT No.: PCT/IB2020/055641
§ 371 (c)(1),
(2) Date: Mar. 28, 2022

(87) PCT Pub. No.: WO2021/059030
PCT Pub. Date: Apr. 1, 2021

(65) Prior Publication Data
US 2022/0330537 A1    Oct. 20, 2022

Related U.S. Application Data

(60) Provisional application No. 62/907,004, filed on Sep. 27, 2019.

(51) Int. Cl.
*A01M 7/00* (2006.01)
*B05B 7/26* (2006.01)
(52) U.S. Cl.
CPC .............. *A01M 7/005* (2013.01); *B05B 7/26* (2013.01)

(58) Field of Classification Search
CPC .................. A01M 7/005; B05B 7/26
USPC ........ 239/159, 170, 303–305, 549, 551, 562
See application file for complete search history.

(56) References Cited

U.S. PATENT DOCUMENTS

| 4,721,245 | A  | * | 1/1988  | van Zweeden | ..... A01M 7/0092 239/155 |
| 5,016,817 | A  | * | 5/1991  | Ghate | ............... B01F 35/71745 239/304 |
| 5,701,156 | A  |   | 12/1997 | Pierce | |
| 5,992,758 | A  |   | 11/1999 | Mack | |
| 7,124,961 | B2 | * | 10/2006 | Wilting | ............... A01M 7/0089 239/303 |
| 8,078,367 | B2 |   | 12/2011 | Sander et al. | |
| 8,800,887 | B2 | * | 8/2014  | Moeller | .............. A01M 7/0089 239/304 |
| 9,148,995 | B2 |   | 10/2015 | Hrnicek et al. | |
| 11,148,158 | B2 | * | 10/2021 | Engelbrecht | ............ B05B 15/55 |

(Continued)

FOREIGN PATENT DOCUMENTS

| EP | 3165073 A1 | 5/2017 |
| EP | 3441784 A1 | 2/2019 |

(Continued)

OTHER PUBLICATIONS

UK Intellectual Property Office, Search report for related UK Application No. GB1915 083.8, dated Apr. 15, 2020.

(Continued)

*Primary Examiner* — Steven J Ganey

(57) ABSTRACT

An agricultural spraying system with a system to add in a second material to the main material that can expand the spraying system to include mixing.

9 Claims, 15 Drawing Sheets

(56) References Cited

U.S. PATENT DOCUMENTS

| | | |
|---|---|---|
| 2007/0242871 A1 | 10/2007 | Prociw et al. |
| 2008/0226133 A1 | 9/2008 | Truche et al. |
| 2009/0134237 A1 | 5/2009 | Giles |
| 2011/0282554 A1 | 11/2011 | Keye |
| 2012/0067969 A1 | 3/2012 | Gong |
| 2012/0154787 A1 | 6/2012 | Brady |
| 2012/0195496 A1 | 8/2012 | Zaman et al. |
| 2014/0001276 A1 | 1/2014 | Joergensen et al. |
| 2014/0284400 A1* | 9/2014 | Hebbert ............... A01M 7/006 239/159 |
| 2016/0266379 A1 | 9/2016 | Li et al. |
| 2017/0024870 A1 | 1/2017 | Reichhardt |
| 2017/0079200 A1* | 3/2017 | Posselius ............. B05B 9/0403 |
| 2017/0206415 A1 | 7/2017 | Redden |
| 2017/0219711 A1 | 8/2017 | Redden et al. |
| 2017/0361360 A1 | 12/2017 | Li et al. |
| 2018/0042215 A1 | 2/2018 | Proharam |
| 2018/0085784 A1 | 3/2018 | Fedigau et al. |
| 2018/0085793 A1 | 3/2018 | Fedigau et al. |
| 2018/0117642 A1 | 5/2018 | Magee et al. |
| 2018/0154406 A1 | 6/2018 | Magee et al. |
| 2018/0264640 A1 | 9/2018 | Holloway et al. |
| 2018/0304282 A1 | 10/2018 | Cook et al. |
| 2022/0151216 A1* | 5/2022 | Stuber ................ G02B 27/0006 |

FOREIGN PATENT DOCUMENTS

| | | |
|---|---|---|
| WO | 9917606 A1 | 4/1999 |
| WO | 02/18059 A1 | 3/2002 |
| WO | 2006117581 A1 | 11/2006 |
| WO | 2015006675 A2 | 1/2015 |
| WO | 2017079366 A1 | 5/2017 |
| WO | 2017194398 A1 | 11/2017 |
| WO | 2018129323 A1 | 7/2018 |
| WO | 2018154490 A1 | 8/2018 |

OTHER PUBLICATIONS

European Patent Office, International Search Report related to International Patent Application No. PCT/IB2020/055641, mail date Sep. 17, 2020.

* cited by examiner

AGRICULTURAL SPRAYING SYSTEM

BACKGROUND

Sprayers and other fluid application systems are used to apply fluids (such as fertilizer, herbicide, insecticide, and/or fungicide) to fields.

DETAILED DESCRIPTION

All references cited herein are incorporated herein in their entireties. If there is a conflict between a definition herein and in an incorporated reference, the definition herein shall control.

Figure 1:
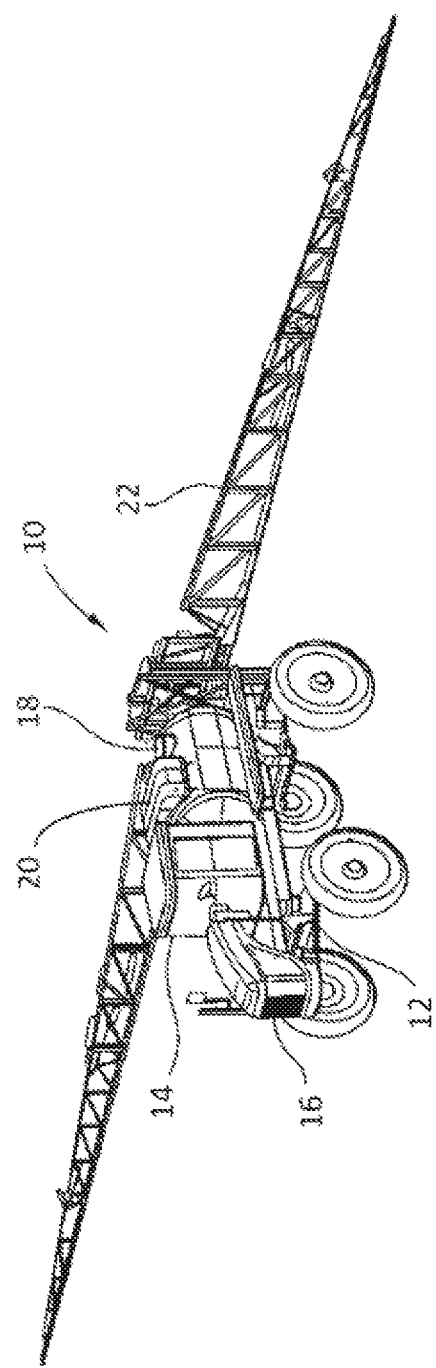
FIG. 1 is an illustration of an agricultural crop sprayer.

Referring to the drawings, wherein like reference numerals designate identical or corresponding parts throughout the several views, FIG. 1 illustrates an agricultural implement, such as a sprayer 10. While the system can be used on a sprayer, the system can be used on any agricultural implement that is used to apply fluid to soil, such as a side-dress bar, a planter, a seeder, an irrigator, a tillage implement, a tractor, a cart, or a robot.

FIG. 1 shows an agricultural crop sprayer 10 used to deliver chemicals to agricultural crops in a field. Agricultural sprayer 10 comprises a chassis 12 and a cab 14 mounted on the chassis 12. Cab 14 may house an operator and a number of controls for the agricultural sprayer 10. An engine 16 may be mounted on a forward portion of chassis 12 in front of cab 14 or may be mounted on a rearward portion of the chassis 12 behind the cab 14. The engine 16 may comprise, for example, a diesel engine or a gasoline powered internal combustion engine. The engine 16 provides energy to propel the agricultural sprayer 10 and also can be used to provide energy used to spray fluids from the sprayer 10.

Although a self-propelled application machine is shown and described hereinafter, it should be understood that the embodied invention is applicable to other agricultural sprayers including pull-type or towed sprayers and mounted sprayers, e.g. mounted on a 3-point linkage of an agricultural tractor.

The sprayer 10 further comprises a liquid storage tank 18 used to store a spray liquid to be sprayed on the field. The spray liquid can include chemicals, such as but not limited to, herbicides, pesticides, and/or fertilizers. Liquid storage tank 18 is to be mounted on chassis 12, either in front of or behind cab 14. The crop sprayer 10 can include more than one storage tank 18 to store different chemicals to be sprayed on the field. The stored chemicals may be dispersed by the sprayer 10 one at a time or different chemicals may be mixed and dispersed together in a variety of mixtures. The sprayer 10 further comprises a rinse water tank 20 used to store clean water, which can be used for storing a volume of clean water for use to rinse the plumbing and main tank 18 after a spraying operation.

At least one boom arm 22 on the sprayer 10 is used to distribute the fluid from the liquid tank 18 over a wide swath as the sprayer 10 is driven through the field. The boom arm 22 is provided as part of a spray applicator system, which further comprises an array of spray nozzles (described later) arranged along the length of the boom arm 22 and suitable sprayer plumbing used to connect the liquid storage tank 18 with the spray nozzles. The sprayer plumbing will be understood to comprise any suitable tubing or piping arranged for fluid communication on the sprayer 10.

FIGS. 2 to 7 illustrate various control systems for controlling fluid flow along the sprayer 10. A main fluid line 50 is in fluid communication with storage tank 18 and runs along boom arm 22. Individual lines 55 provide fluid from fluid line 50 to valves (100, 110). Control valve 100 is a combination valve and nozzle. In other embodiments, valve 110 can be separate from nozzle 120.

Control modules 200 can be disposed along sprayer 10 to control valves (100, 110) to control the flow of fluid to nozzles (100, 120). Control modules 200 can control a plurality (2 or more) valves (100, 110). Control modules 200 can be connected to each other in series, and control modules can be connected to a monitor 1000, such as the monitor disclosed in U.S. Pat. No. 8,078,367. Control module 200 can receive input from the monitor 1000 to control the flow rate through nozzles (100, 120). An operator can input a selected flow rate into the monitor, and the monitor 1000 can send signals to control module 200 to control the flow rate. The flow rate control can include swath control to speed up or slow down the flow rate on a turn. The row specific control can be controlled from the monitor 1000, or the control module 200 can control the flow rate.

Figure 2:
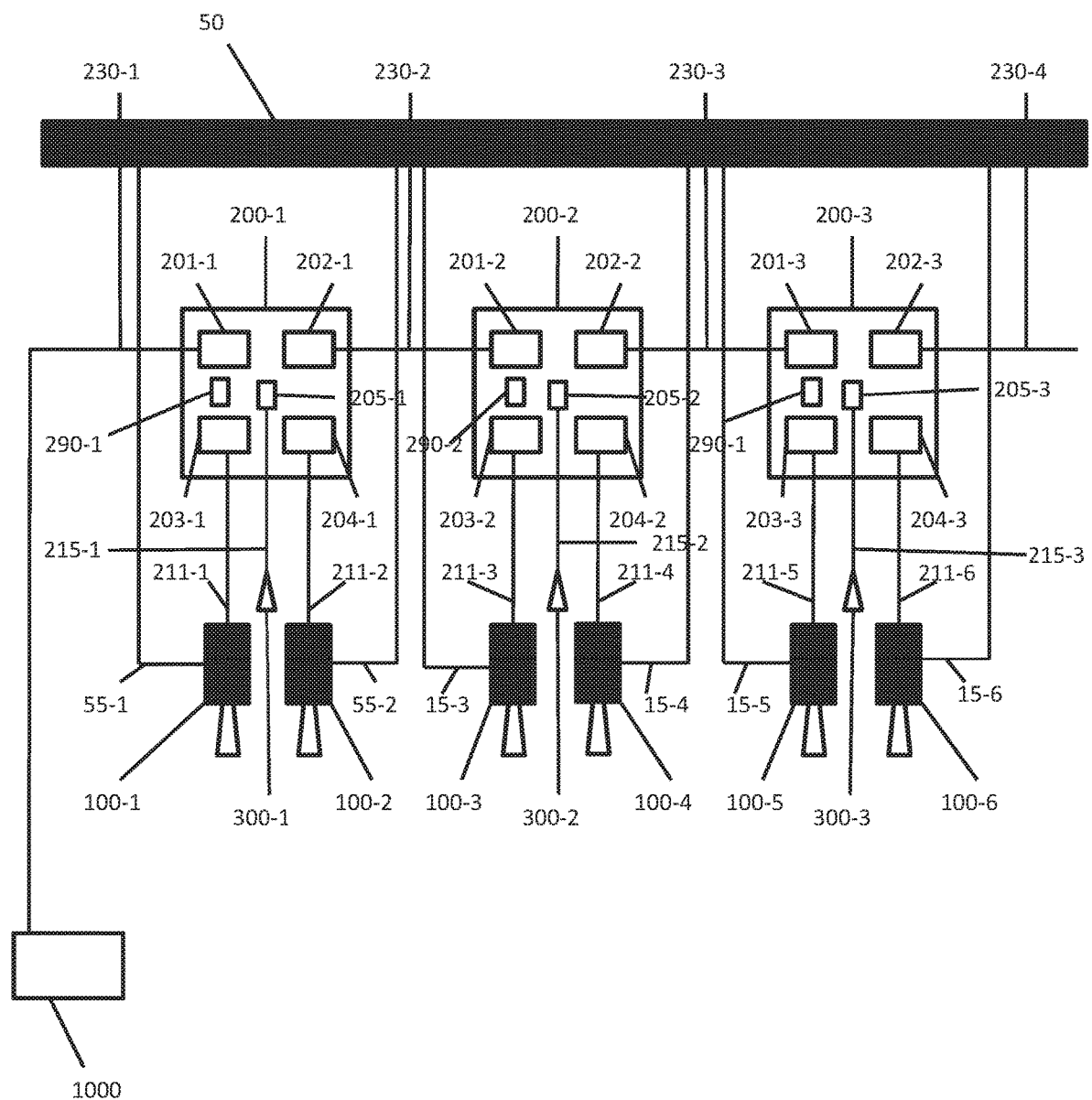
FIG. 2 is a schematic illustration of fluid flow and electronic control system according to one aspect.

FIG. 2 is illustrated with three control modules 200, but more or less can be used depending on the size of sprayer 10. A first control module 200-1 has four ports 201-1, 202-1, 203-1, and 204-1. Ports 201-1 and 202-1 connect first control module 200-1 to an adjacent control module, such as second control module 200-2 via wire 230-2, another control module 200 not shown or to monitor 1000 via wire 230-1. Second control module 200-2 can connect to third control module 200-3 via wire 230-3. If there are additional control modules 200, then third control module 200-3 can connect to an adjacent control module 200 via wire 230-4. For the last control module 200 in the series, then port 202 does not connect to an adjacent module.

Each control module 200 can control two adjacent control valves 100. For control module 200-1, port 203-1 is connected to valve 100-1 via wire 211-1, and port 204-1 is connected to valve 100-2 via wire 211-2. Likewise, port 203-2 is connected to valve 100-3 via wire 211-3, port 204-2 is connected to valve 100-4 via wire 211-4, port 203-4 is connected to valve 100-5 via wire 211-5, and port 204-3 is connected to valve 100-6 via wire 211-6. Each valve 100 (100-1, 100-2, 100-3, 100-4, 100-5, 100-6) is in fluid communication with main fluid line 50 via lines 55-1, 55-2, 55-3, 55-4, 55-5, 55-6, respectively.

Optionally, an instrument 300 (300-1, 300-2, 300-3) can connect to an optional port 205 (205-1, 205-2, 205-3) on control module 200 (200-1, 200-2, 200-3) via wire 205 (205-1, 205-2, 205-3). The functions of instrument 300 are discussed below. Optionally, an accelerometer 290 (290-1, 290-2, 290-3) can be included in control module 200. The function of accelerometer 290 is described below.

Figure 3:
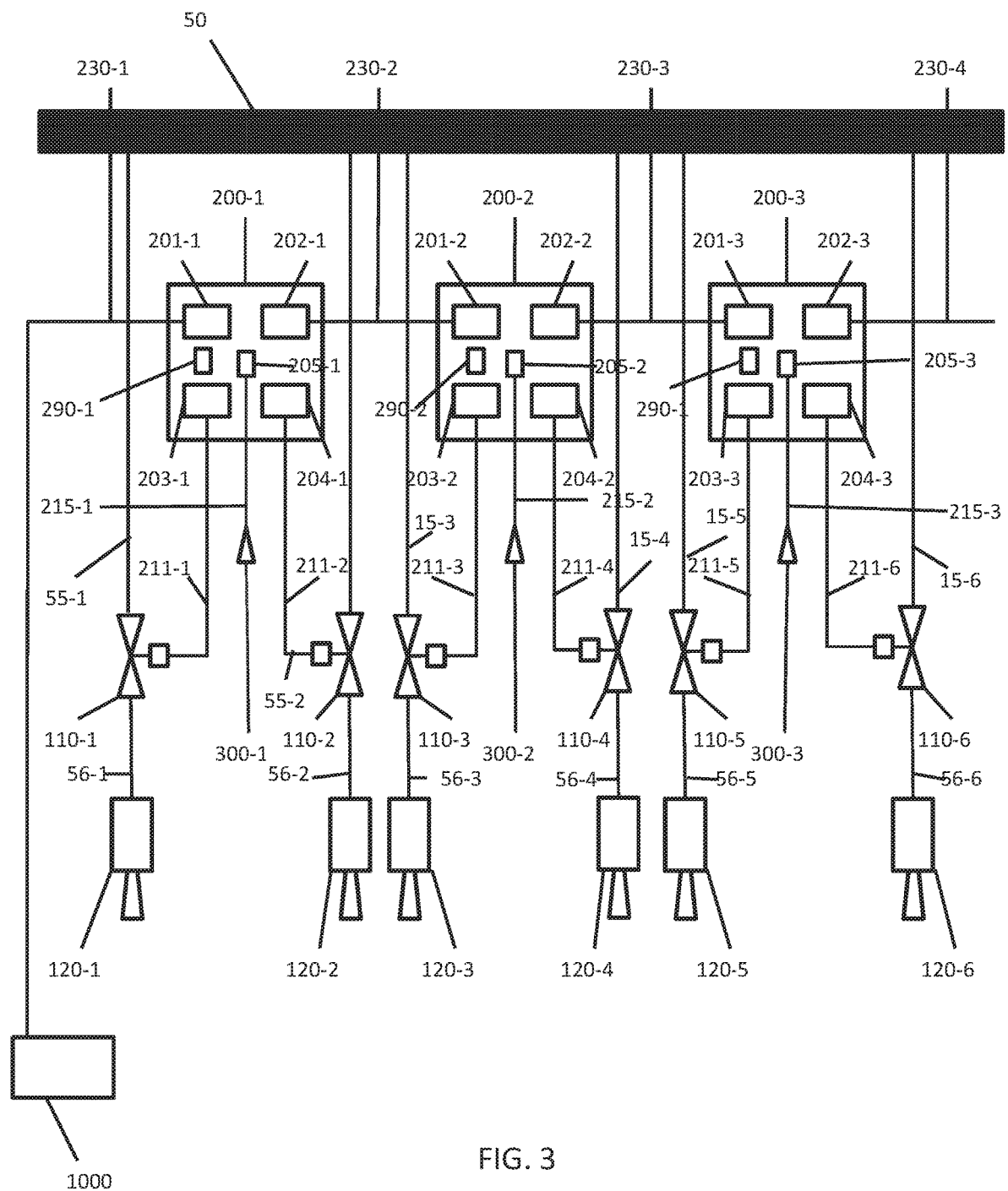
FIG. 3 is a schematic illustration of fluid flow and electronic control system according to one aspect.

FIG. 3 is the same as FIG. 2 except that control valve 100, which is a combination valve and nozzle, is replaced with a separate valve 110 (110-1, 110-2, 110-3) and nozzle 120 (120-1, 120-2, 120-3) with line 56 (56-1, 56-2, 56-3) connecting valve 110 and nozzle 120.

In FIGS. 4-7, a second fluid line 60 is in fluid communication with a second storage tank 18-*b* (not shown) and runs along boom arm 22. Second fluid line 60 provides a second fluid to be mixed with the first fluid from main fluid line 50. There may be situations in which materials may not stay mixed from a storage tank until they are dispensed. Also, there may be times when the second fluid is only to be applied at certain times (intermittently). Examples of intermittent application include, but are not limited to, applying a second chemical to an intermittent weed growing the field to kill the weed, applying a second chemical to an insect, applying a second chemical to a plant to treat a condition (such as a fungal infection), or to apply the second chemical in between plants.

Figure 4:
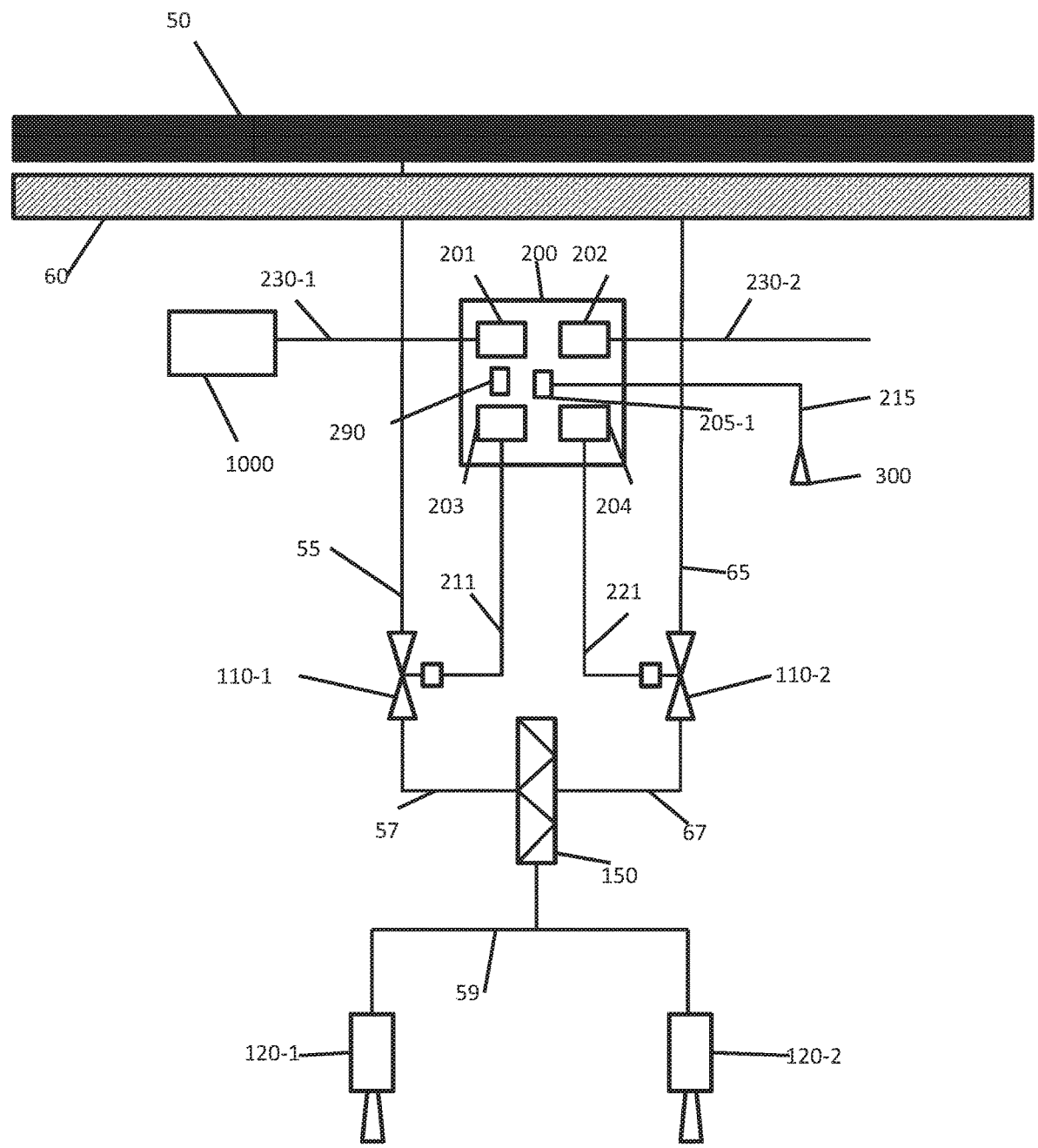
FIG. 4 is a schematic illustration of fluid flow and electronic control system according to one aspect.

FIG. 4 illustrates one control module 200, but as above, there can be more depending on the size of the sprayer 10. Control module 200 has ports 201, 202, 203, and 204 as described above along with wires 230-1 and 230-2 (if needed) to connect control module 200 to other control modules 200 or the monitor 1000. Valve 110-1 is in fluid communication with main fluid line 50 via line 55. Valve 110-1 connects to mixer 150 via line 57. Valve 110-1 is connected to port 203 via wire 211. Valve 110-2 is in fluid communication with second fluid line 60 via line 65. Valve 110-2 connects to mixer 150 via line 67. Valve 110-2 is connected to port 204 via wire 221. Mixer 150 is connected to nozzles 120-1 and 120-2 via split line 59. While shown schematically, mixer 150 can be disposed just before nozzles 120-1 and 120-2. Optionally, an instrument 300 can be connected to optional port 205 via wire 215. Optionally, an accelerometer 290 can be included in control module 200.

Figure 5:
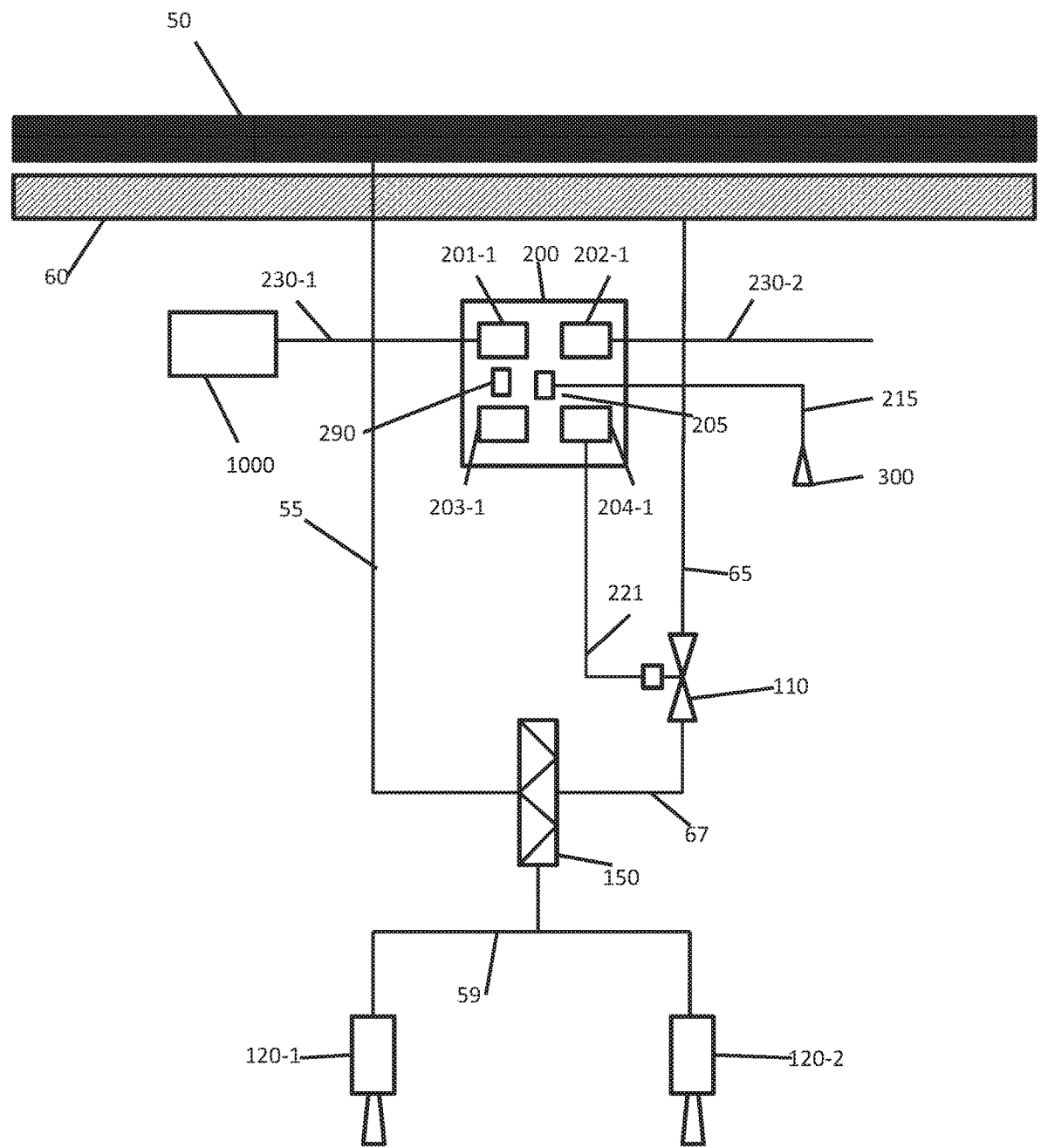
FIG. 5 is a schematic illustration of fluid flow and electronic control system according to one aspect.

FIG. 5 illustrates a simplified version of FIG. 4 by removing valve 110-1, wire 211, and line 57. Line 55 is connected directly to mixer 150.

Figure 6:
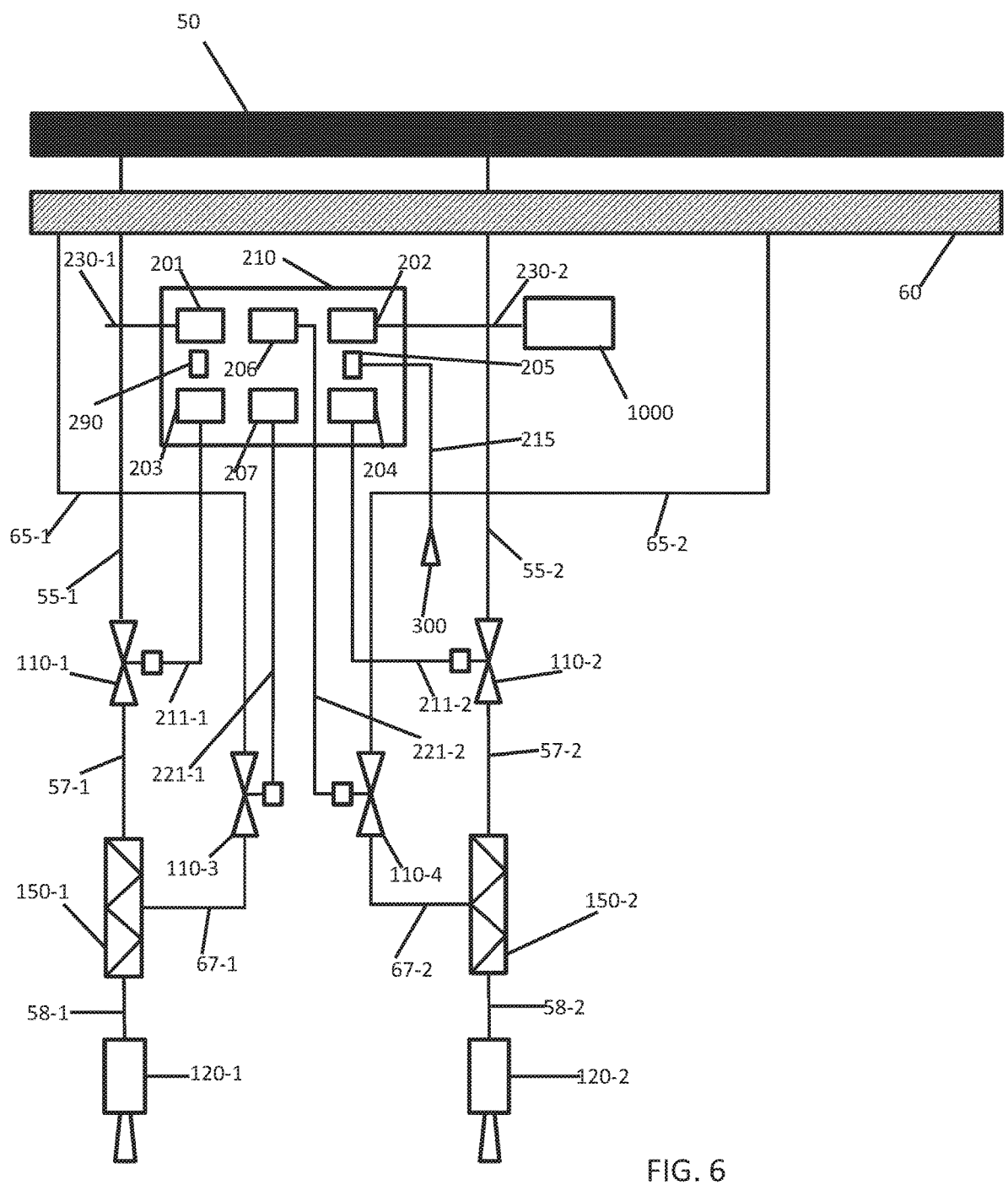
FIG. 6 is a schematic illustration of fluid flow and electronic control system according to one aspect.
Figure 7:
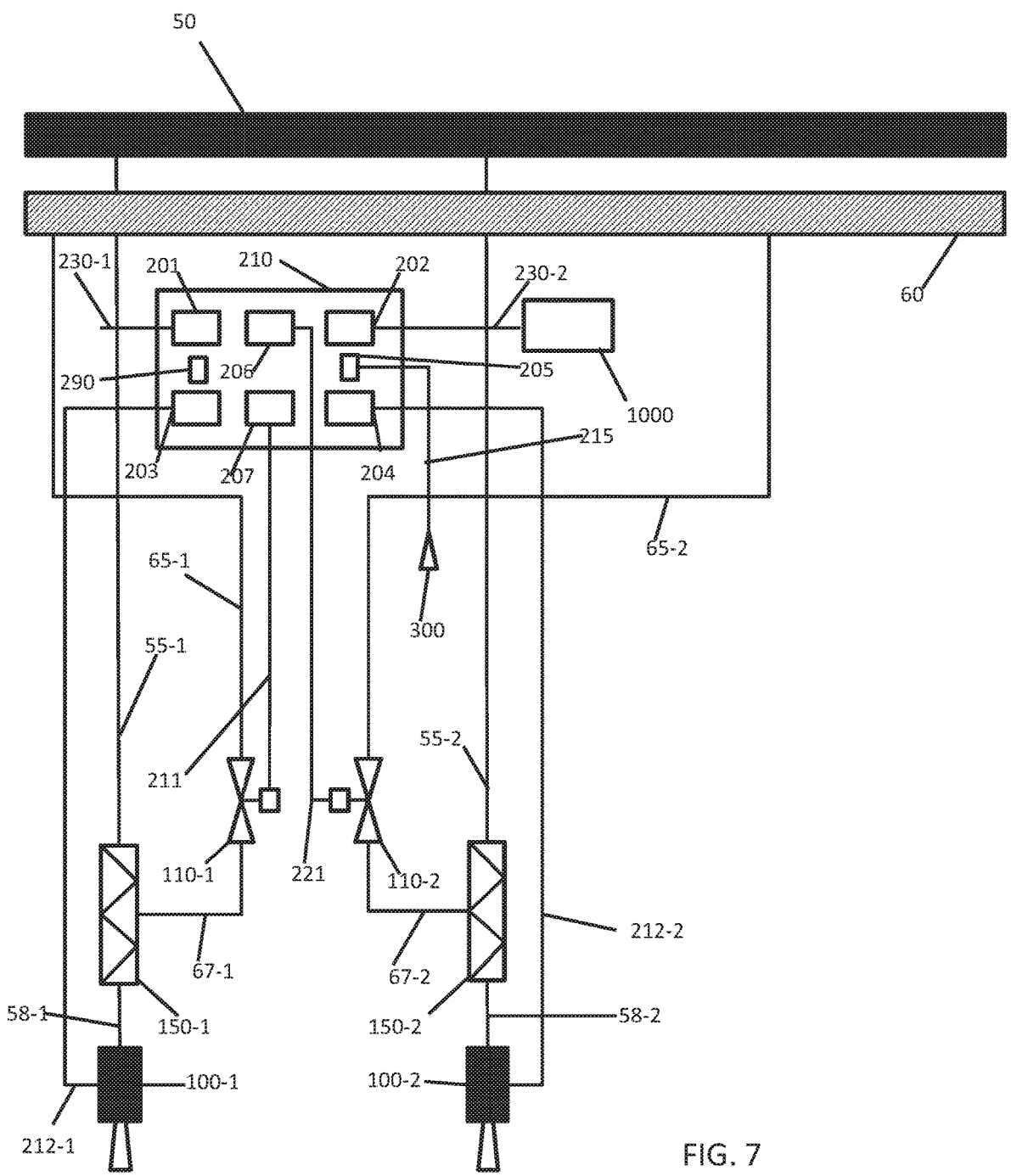
FIG. 7 is a schematic illustration of fluid flow and electronic control system according to one aspect.

FIGS. 6 and 7 are similar to FIG. 4 except that each mixer only connects to one valve (100, 110). To accommodate the additional valve control, control module 200 is replaced with control module 210 to add an additional two ports 206 and 207.

FIG. 6 illustrates one control module 210, but as above for control module 200, there can be more depending on the size of the sprayer 10. Control module 210 has ports 201, 202, 203, and 204 as described above along with wires 230-1 and 230-2 (if needed) to connect control module 210 to other control modules 210 or the monitor 1000, and control module 210 has ports 206 and 207. Valves 110-1 and 110-2 are in fluid communication with main fluid line 50 via lines 55-1 and 55-2, respectively. Valve 110-1 is connected to port 203 via wire 211-1, and valve 110-2 is connected to port 204 via wire 211-2. Valves 110-3 and 110-4 are in fluid communication with second fluid line 60 via lines 65-1 and 65-2, respectively. Valve 110-3 is connected to port 207 via wire 221-1, and valve 110-4 is connected to port 206 via wire 221-2. Valves 110-1 and 110-3 connect to mixer 150-1 via lines 57-1 and 67-1, respectively. Mixer 150-1 connects to nozzle 120-1 via line 58-1. Valves 110-2 and 110-4 connect to mixer 150-2 via lines 57-2 and 67-2, respectively. Mixer 150-2 connects to nozzle 120-2 via line 58-2. Optionally, an instrument 300 can be connected to optional port 205 via wire 215. Optionally, an accelerometer 290 can be included in control module 210.

FIG. 7 is a modification of FIG. 6 by removing valves 110-1 and 110-2 and having lines 55-1 and 55-2 connect to mixers 150-1 and 150-2, respectively. Nozzles 120-1 and 120-2 are replaced with valves 100-1 and 100-2, respectively. Valve 100-1 is connected to port 203 via wire 212-1, and valve 100-2 is connected to port 204 via wire 212-2.

Figure 10:
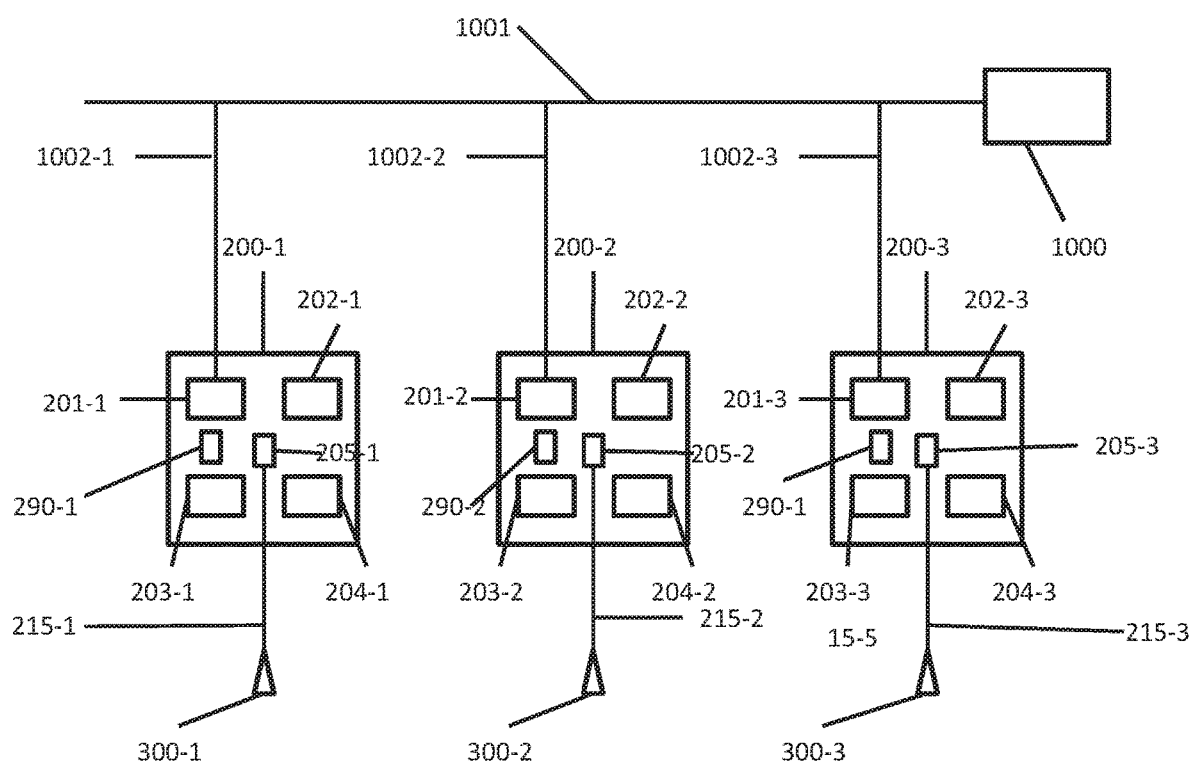
FIG. 10 is a schematic illustration of an electronic control system according to one aspect.

FIG. 10 illustrates an alternative configuration for any of the above systems. Instead of control modules 200 (200-1, 200-2, 200-3) being wired in series, they can be wired in parallel. A main wire 1001 can be connected to monitor 1000, as described above, and individual wires 1002 (1002-1, 1002-2, 1002-3) connect main wire 1001 to each control module 200 (200-1, 200-2, 200-3), respectfully, to port 201 (201-1, 201-2, 201-3). In this configuration, port 202 (202-1, 202-3, 202-4) does not need to be include, or it can be available for another use.

Figure 11:
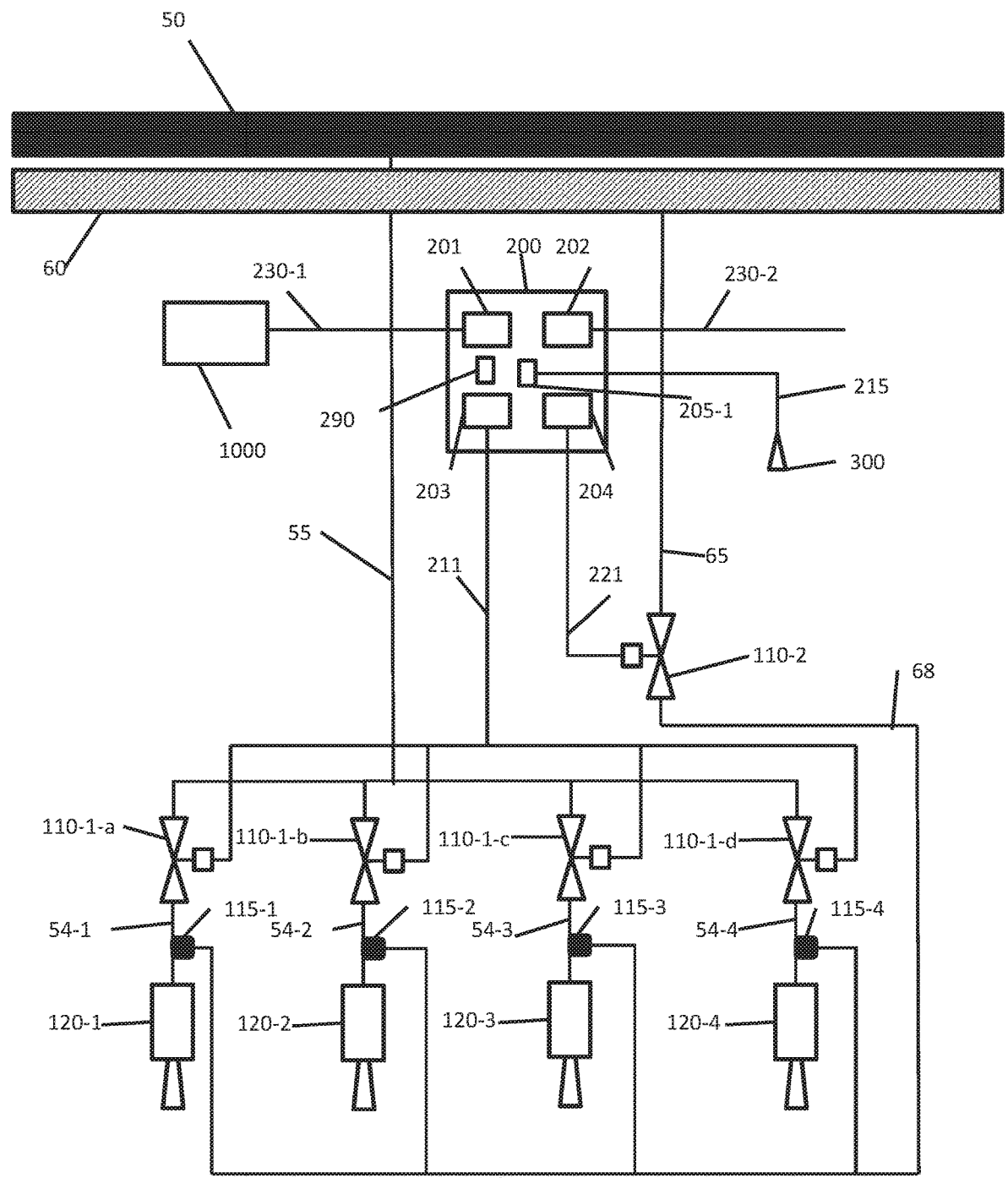
FIG. 11 is a schematic illustration of fluid flow and electronic control system according to one aspect.
Figure 12:
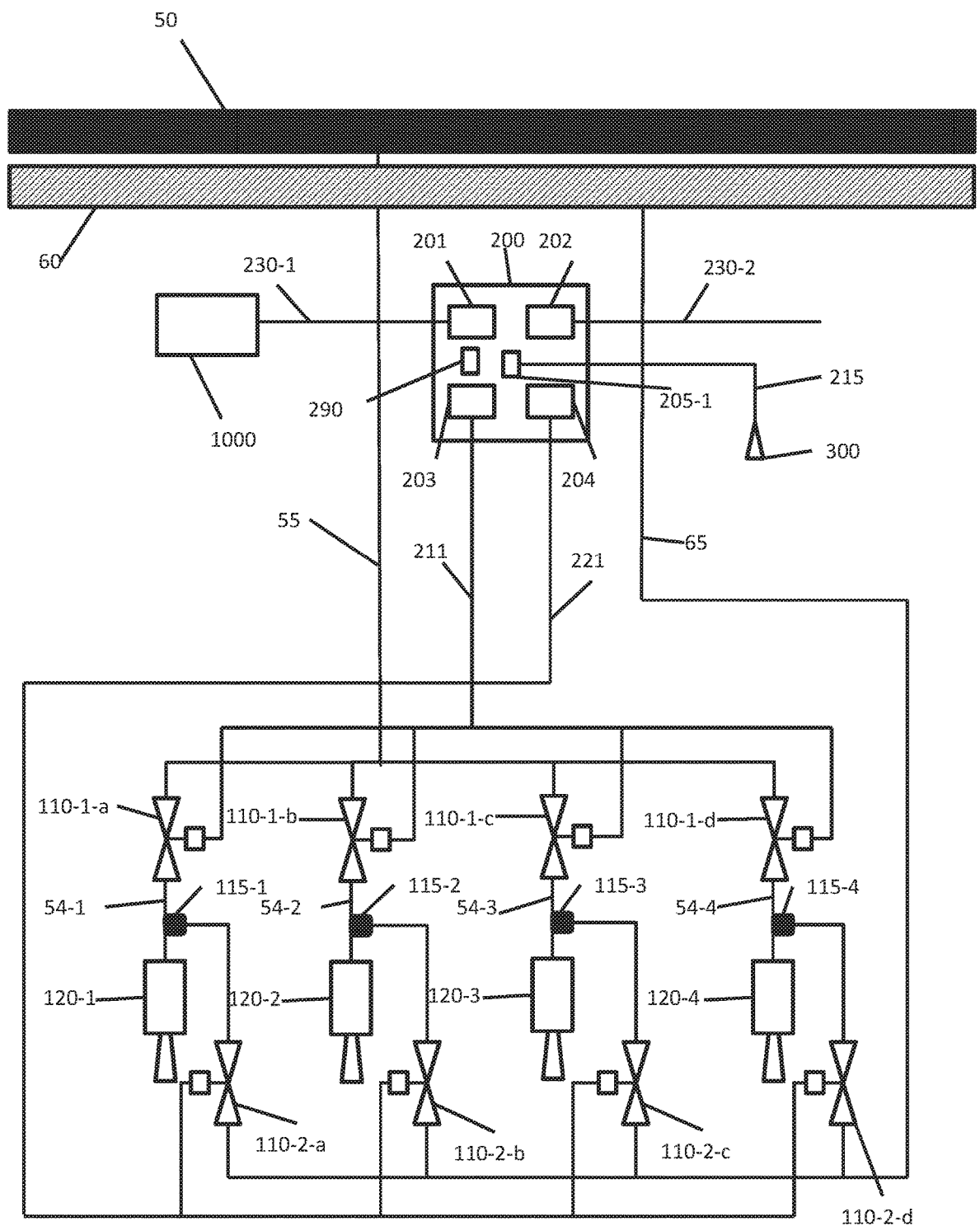
FIG. 12 is a schematic illustration of fluid flow and electronic control system according to one aspect.

FIG. 11 illustrates an alternative configuration in which the second fluid is added to the first fluid between control valve 110 (110-1-*a* to 110-1-*d*) and nozzle 120 (120-1 to 120-4) via connector 115 (115-1 to 115-4) in line 54 (54-1 to 54-4). Control module 200 in this embodiment does not need to include accelerometer 290 or optional port 205. FIG. 11 is illustrated with four units (control valve 110-1-*a* to 110-1-*d*) all controlled via port 203. Any number of units can be controlled in this configuration from 1, 2, 3, 4, or any greater number. Sections can be created with two or more units. Connector 115 can be any piping connector to connect two pipes together. In one embodiment, connector 115 is connectable and detachable. In one embodiment, connector 115 is a push to connect connector. Having connector 115 detachable allows for expansion from a main spraying system to add in a second material to be mixed into the first material. FIG. 11 illustrates the control of the second fluid through one control valve 110-2 to each line 54 (54-1 to 54-4). Instead of one control to a plurality of lines for the second fluid, FIG. 12 illustrates individual control through individual control valves 110 (110-2-*a* to 110-2-*d*). Again while illustrated with four units, any number of units can be controlled in this configuration from 1, 2, 3, 4, or any greater number.

In the plurality of unit configuration in FIGS. 11 and 12, which is illustrated with four control valves 110-1-*a*, 110-1-*b*, 110-1-*c*, and 110-1-*d*, the configuration can be operated such that pairs of control valves 110-1-*a*, 110-1-*b*, 110-1-*c*, and 110-1-*d* are operated together. In this four unit configuration, half of the control valves 110-1-*a*, 110-1-*b*, 110-1-*c*, and 110-1-*d* can be pulsed on while the other half are off. For example, Control valves 110-1-*a* and 110-1-*c* can be pulsed open while control valves 110-1-*b* and 110-1-*d* are closed. In another embodiment, the same can occur for control valves 110-2-*a*, 110-2-*b*, 110-2-*c*, and 110-2-*d*.

Figure 13:
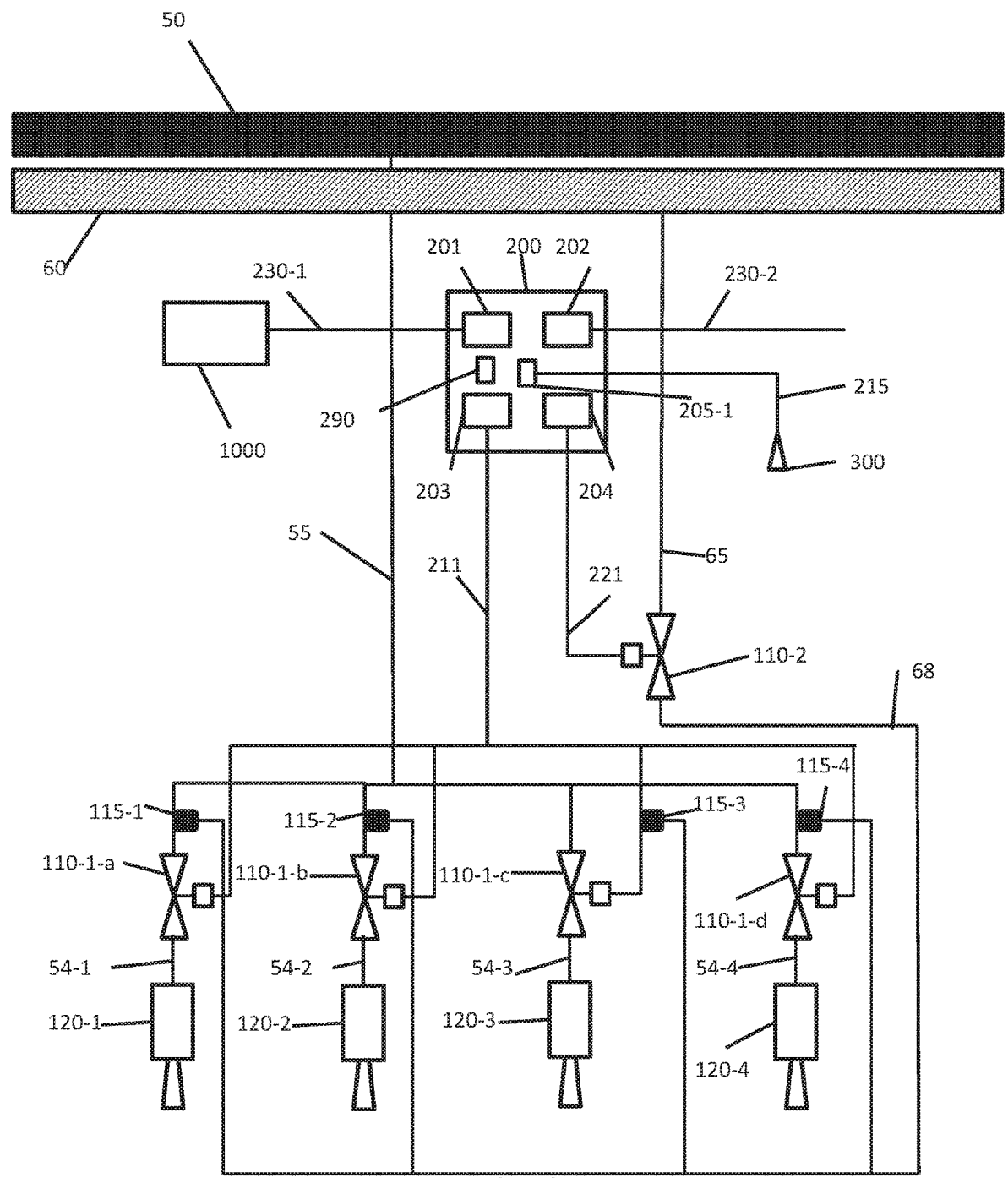
FIG. 13 is a schematic illustration of fluid flow and electronic control system according to one aspect.
Figure 14:
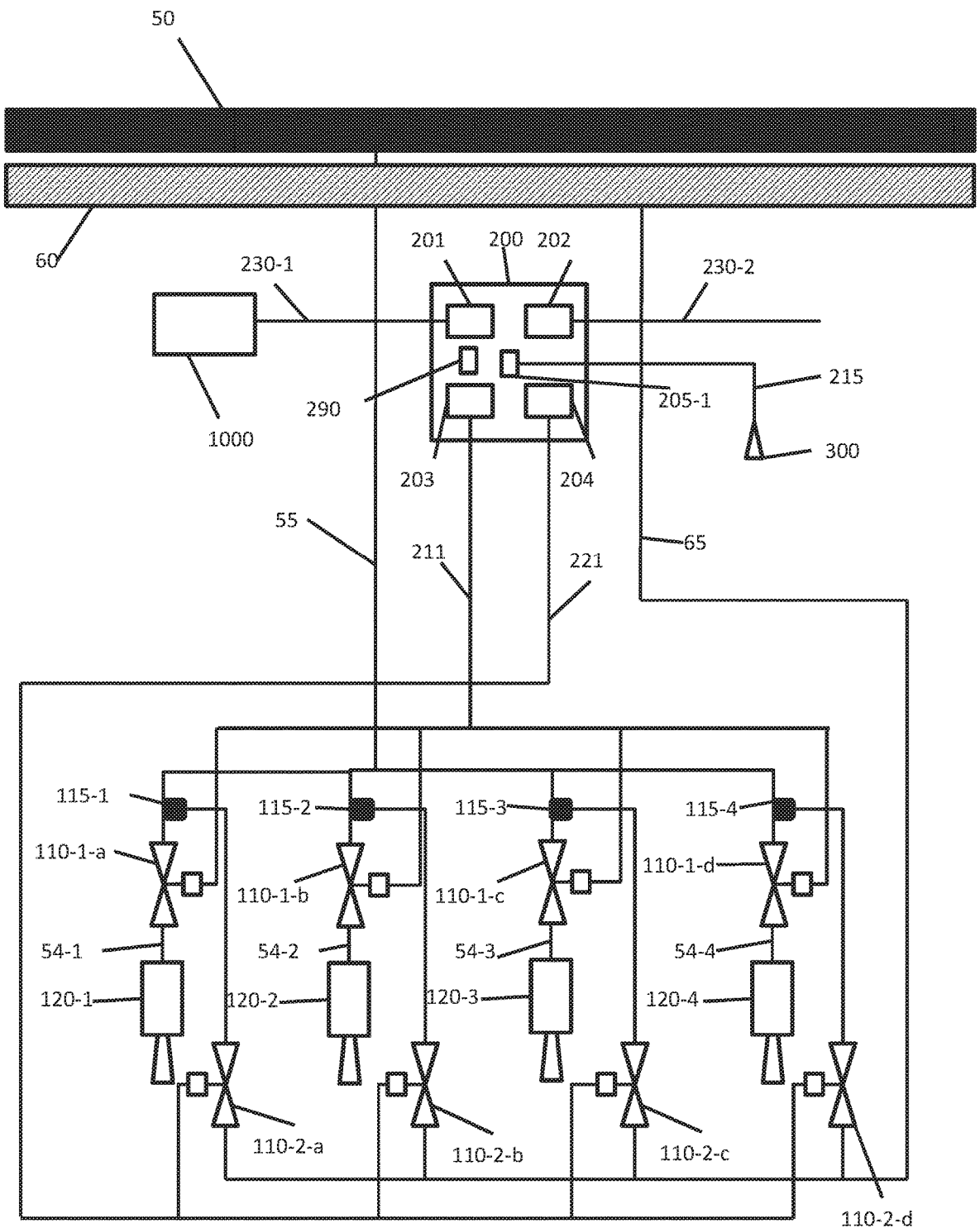
FIG. 14 is a schematic illustration of fluid flow and electronic control system according to one aspect.

FIG. 13 is an alternative embodiment to FIG. 11 in which the second fluid is added to the first fluid prior to control valves 110-1-*a* to 110-1-*d*. The same alternative also applies to the embodiment in FIG. 12 and is illustrated in FIG. 14.

The various combinations above can provide a simplified system by reducing the number of components (one control module controlling two or more rows individually as opposed to one control module per row, or controlling adjacent nozzles with shared lines and valves to reduce the number of valves). Simplifying the system allows for the addition of instruments to provide additional features (as described below) while maintaining a similar system cost as row by row configurations.

Instrument

Examples of instrument 300 include, but are not limited to, camera, time of flight camera, radar, Lidar, or ultrasonic (transceiver or separate transmitter and separate receiver). Instrument 300 can be used for one or more purposes.

In one embodiment, instrument 300 can measure boom height for a distance between boom 22 and the ground. This can be done with a time of flight camera, Lidar, radar, or ultrasonic. Examples can be found in U.S. Pat. Nos. 9,148, 995, 5,992,758; U.S. Patent Application Publication Number 20110282554; and EP3165073.

In another embodiment, instrument 300 can analyze plants or weeds in the field. Plants and weeds can be analyzed for placement in the field to determine placement (spacing), plant emergence, percentage of coverage in a field (such as percent of weeds by number or by area), plant growth stage, height of the plant/weed, leaf size of the plant/leaf, disease (such as fungus) presence and/or percent of coverage of disease on the plant, sense plant/weed height relative to the ground, stalk size, plant/weed leaf distance relative to the top of the plant/weed. Examples can be found in U.S. Patent Application Publication Numbers US20120195496US20140001276, US20170206415, US20170219711; PCT Publication Numbers WO2018154490, WO2017194398, WO2015006675, WO2006117581, WO9917606. Height of a plant/weed, stalk size, disease percentage, and/or percentage of weeds can be used to determine how much fluid is applied to the plant/weed. The flow rate of material at each nozzle can be varied by changing the flow rate of material at each nozzle and/or changing the spray pattern of the nozzle to apply the selected amount of fluid to each plant/weed to avoid waste, avoid overtreatment, avoid undertreatment, and/or minimize volatilization of fluid.

Determining the placement of plants in the field can be used for determining whether sprayer 10 is staying within the rows of plants as sprayer 10 traverses the field. If sprayer 10 is not staying in between the rows of plants, an operator can be alerted to alter the course of sprayer 10, or a signal can be sent to the automatic steering control of sprayer 10.

In another embodiment, instrument 300 (such as a camera) can analyze the droplet size and/or spray pattern of fluid dispensed from nozzles (100, 120) or whether there is blockage (lack of flow) from nozzles (100, 120). Based on the analysis of the droplet size and/or spray pattern, nozzles (100, 120) can be adjusted to change the droplet size and/or spray pattern. Examples of systems for analyzing sprays can be found in U.S. Patent Publication Numbers US20180264640, US20170024870, US20120195496, US20120154787, US20080226133, US20070242871; PCT Publication Number WO2017079366; EP Publication Number EP3441784; or U.S. Pat. No. 5,701,156.

In another embodiment, instrument 300 can collect information to calculate or estimate the flow rate (absolute or relative) by nozzle 100, 120 based on the above camera sensing information of the spray. Individual nozzle flow rate can be estimated by taking relative measurements for each nozzle 100, 120 and apportioning that ratio to the total fluid flow rate being measured by a meter (not shown) or commanded.

Figure 8A:
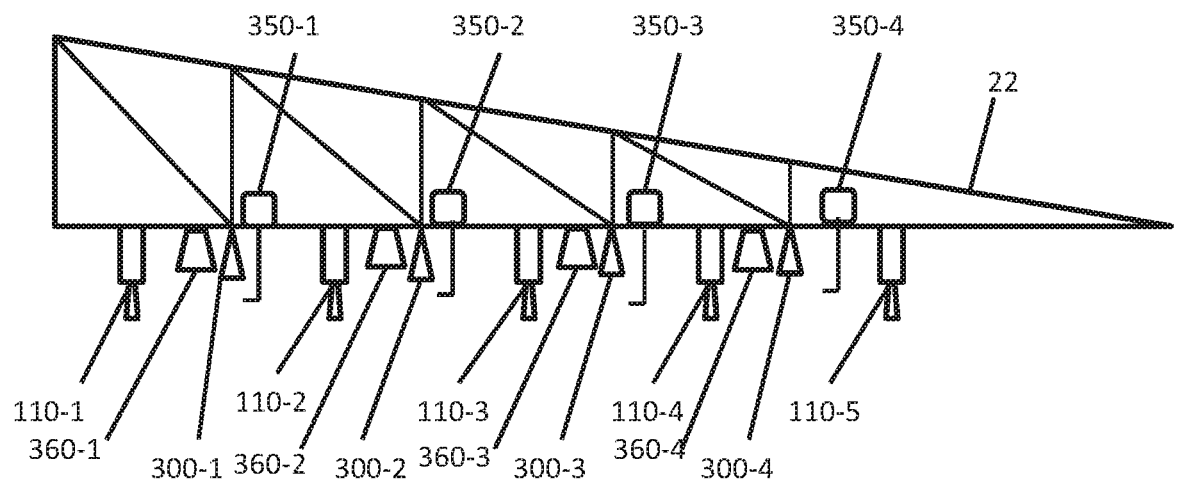
FIG. 8A illustrates a spray boom with a gas dispenser disposed adjacent to a camera according to one embodiment.

Optionally, a light 360 can be used in combination with camera 350 to provide any desired wavelength of light to be captured by camera 350 or to be strobed. Light 360 can be placed anywhere adjacent camera 350 to illuminate a field to be viewed by camera 350. FIG. 8A illustrates a possible placement of light 360 (360-1, 360-2, 360-3, 360-4). Light 360 can be an LED light, To save power, light 360 can be signaled to be on when camera 350 is capturing an image and off when not.

Further to power saving, a subset of instruments 300 can be on at any given time. The percentage of instruments 300 on can be determined by the speed of sprayer 10 so that data is still collected for each selected portion of the field.

In another embodiment, instrument 300 can be a light plane triangulator. An example of light plane triangulator is the scanCONTROL 2D/3D laser scanner (laser profile sensor) from Micro-Epsilon of Raleigh, North Carolina, USA, as disclosed in published Brochure No. Y9766353-G021077GKE. The light plane triangulator can measure boom height or the height of a plant/weed.

Dual Instrument

Any of the above listed instruments 300 can be used in combination. In one embodiment, multiple cameras (two or more) can be used with each one operating with different wavelengths. One example is an infrared camera (e.g., using an infrared filter) in combination with a visible light camera. Another example is two of the same cameras to obtain 3D stereoscopic images. Multiple instruments 300 can be synchronized to collect data simultaneously of the same space.

Figure 15A:
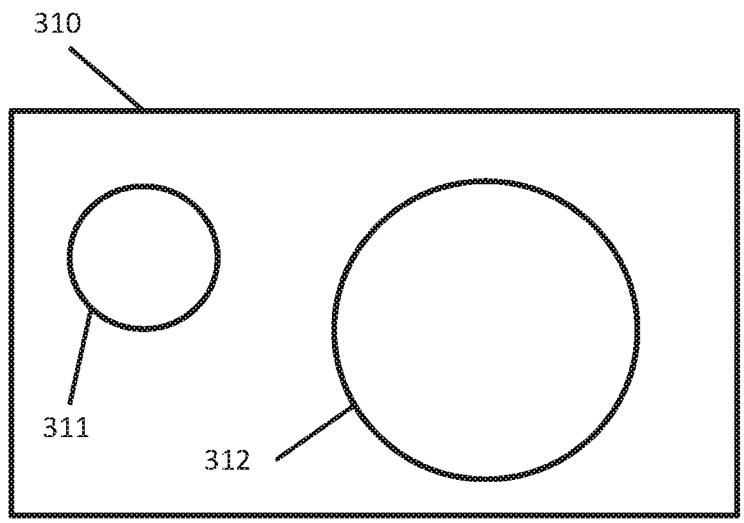
FIG. 15A is an illustration of a camera with a plurality of lenses.
Figure 15B:
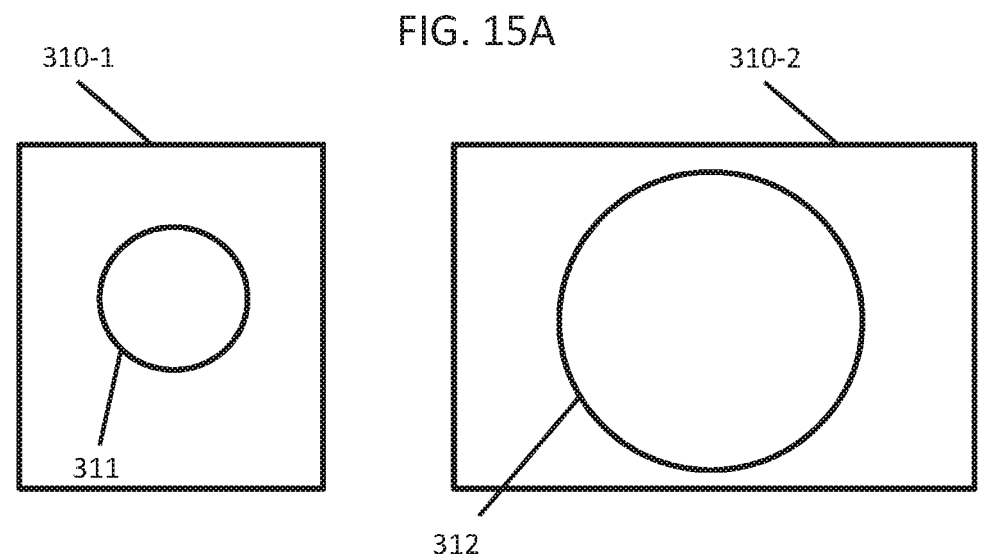
FIG. 15B is an illustration of a plurality of cameras.

In another embodiment, there can be lenses with different focal lengths to obtain different fields of view. There can be two or more lenses depending on the fields of view desired. FIG. 15A illustrates an embodiment with camera 310 having a first lens 311 with a first focal length and a second lens 312 with a second focal length. One can be wide angle while the other is telephoto. This can assist with viewing a wide field to find an area of interest in an image, such as a weed or disease, and then the camera 310 can switch to the telephoto lens to magnify an area for more specific review. While camera 310 is illustrated with multiples lenses 311 and 312, alternatively, there can be separate cameras 310-1 and 310-2 each having one lens 311 or 312, respectively, which is illustrated in FIG. 15B.

Lens Cleaning

There are multiple ways to keep a lens (not shown) of camera 300 clean or to clean the camera lens.

In one embodiment, an ultrasonic lens cleaning system can be used. Examples of ultrasonic lens cleaning systems can be found in U.S. Patent Application Publication Nos. US20180304282A1; US20170361360A1; US20180154406A1; US20180117642A1; US20180085793A1; US20180085784A1; and US20160266379A1.

Figure 8B:
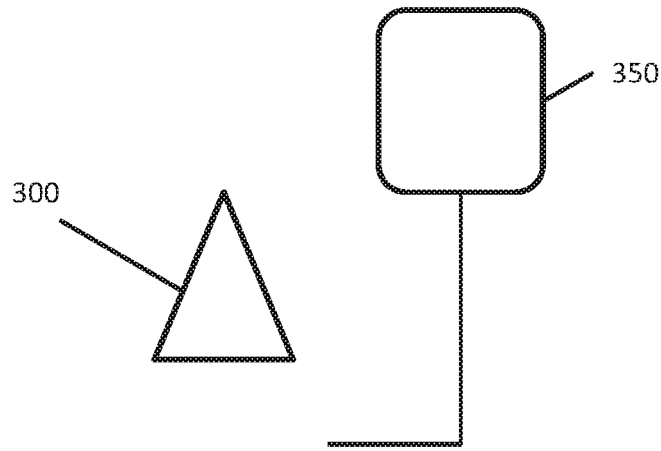
FIG. 8B is an enlarged view of the camera with the gas dispenser of FIG. 8A.

In another embodiment as illustrated in FIGS. 8A and 8B, a gas dispenser 350 (350-1, 350-2, 350-3, 350-4) can be disposed on boom 22 proximate to instrument 300 (300-1, 300-2, 300-3, 300-4) to propel a gas stream into the field of view of camera 300 to expel any dust or debris that is in the field of view to provide an unobstructed view for the camera. Gas dispenser 350 is in fluid communication with a gas source, such as air (not shown). Gas dispenser can have a nozzle (not shown) for changing the dispersal of gas. Alternatively, gas dispenser 350 can be replaced by a fan (not shown) to propel air across the field of view.

Figure 9A:
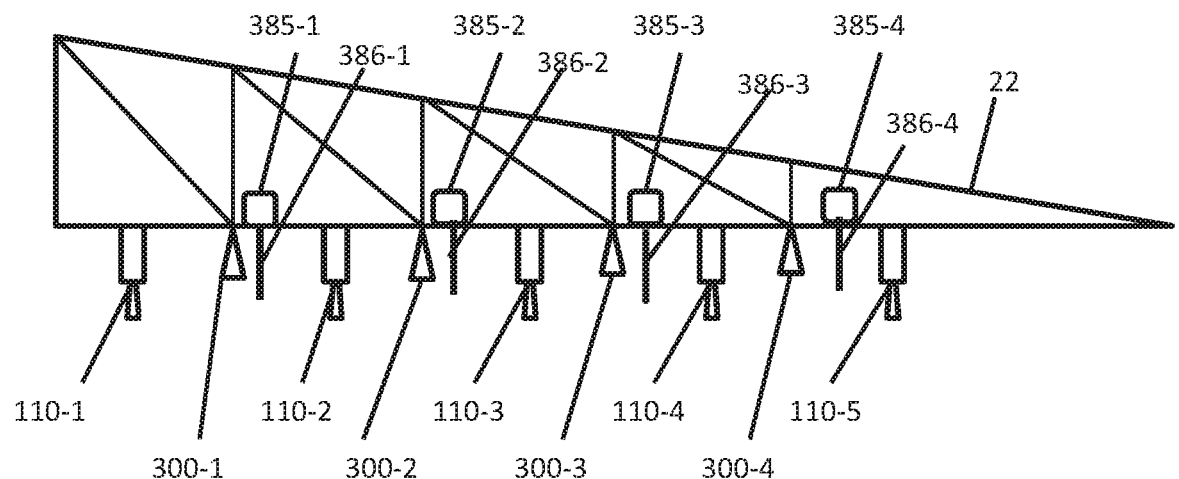
FIG. 9A illustrates a spray boom with an electrostatic charging system disposed adjacent to a camera according to one embodiment.
Figure 9B:
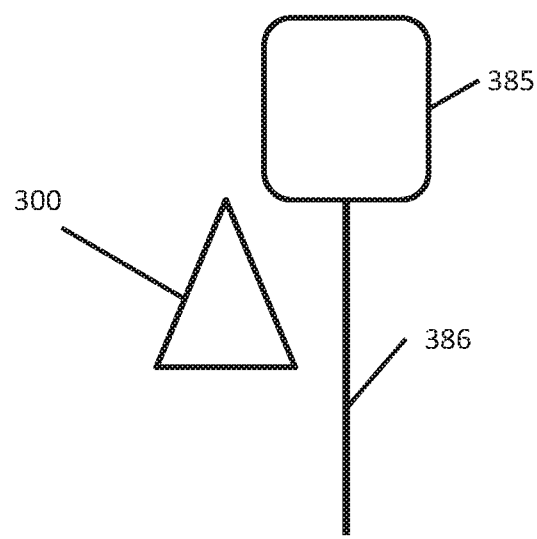
FIG. 9B is an enlarged view of the camera with the electrostatic charging system of FIG. 9A.

Instrument 300 can have an electrostatic coating on its lens to repel dust. Also, instrument 300 can have a hydrophobic coating to repel any buildup on camera 350. In another embodiment as illustrated in FIGS. 9A and 9B, an electrostatic charging system 385 can be disposed proximate to camera 350 to impart an electrostatic charge to liquid particles or dust particles to then be repelled by the electrostatic coating on instrument 300. Electrostatic charging system 385 can have one or more rods 386 to provide the electrostatic charge to the dust particles. Instead of a rod shape, rods 386 can have any other shape, such as a plate shape.

Accelerometer

Controller 200/210 can further include an accelerometer 290 to measure vertical acceleration of boom 22. There can be one accelerometer 290 per boom or one accelerometer per controller 200/210. Measuring vertical acceleration allows for the calculating Good Ride (Smooth Ride) as is described in U.S. Pat. No. 8,078,367. When Good Ride is not within a desired range, this indicates that too much bounce is being created by driving too fast. An operator can slow down the sprayer to reduce bounce. Excess bounce creates variability in delivering the specified amount of fluid to an area.

Accelerometer 290 can also be used to determine the height of a nozzle (100, 120) off of the ground by knowing the acceleration and change in position of control module 200, 210 in relation to nozzle (100, 120). This embodiment can also be using in conjunction with boom height sensing above. Knowing the height off of the ground allows for adjustment of nozzle 100, 120 to change the spray characteristic to maintain a desired application.

Mapping

Any data collected by instrument 300 or accelerometer 290 can be associated with spatial coordinates from a global positioning system (GPS) (not shown) to generate a map of the data across the field. Any data collected can be shown numerically or graphically on the monitor 1000 either alone or in combination with any other data. Multiple maps can be viewed side by side on the monitor 1000 or in combination with numerical data. One combination could include the amount of material sprayed (actual volume or mass, nozzle configuration, or duty cycle of the valve 100, 110) at a set of coordinates along with the data that prompted that amount of material, such as placement in the field to determine placement (spacing), plant emergence, percentage of coverage in a field (such as percent of weeds by number or by area), plant growth stage, height of the plant/weed, leaf size of the plant/leaf, disease (such as fungus) presence and/or percent of coverage of disease on the plant, sense plant/weed height relative to the ground, stalk size, plant/weed leaf distance relative to the top of the plant/weed.

The foregoing description is presented to enable one of ordinary skill in the art to make and use the invention and is provided in the context of a patent application and its requirements. Various modifications to the preferred embodiment of the apparatus, and the general principles and features of the system and methods described herein will be readily apparent to those of skill in the art. Thus, the present invention is not to be limited to the embodiments of the apparatus, system and methods described above and illustrated in the drawing figures, but it is to be accorded the widest scope consistent with the scope of the appended claims.

The invention claimed is:

1. An agricultural system for applying fluid to a field comprising:
    a first fluid line supplying a first fluid;
    a second fluid line supplying a second fluid; and
    a unit comprising:
        a branch line in fluid communication with the first fluid line and leading to a single nozzle;
        a valve disposed in the branch line disposed before the nozzle, the valve for controlling flow of the first fluid to the single nozzle;
        a connector disposed in the branch line prior to or after the valve with the second fluid line in fluid communication with the connector, wherein the second fluid is added to the first fluid via the connector.

2. The agricultural system of claim 1, wherein the connector is disposed between the valve and the single nozzle.

3. The agricultural system of claim 1, wherein the connector is disposed before the valve.

4. The agricultural system of claim 1, wherein the connector is a push to connect connector.

5. The agricultural system of claim 1, wherein the system comprises a plurality of units.

6. The agricultural system of claim 1, wherein there is a section comprising a plurality of units.

7. The agricultural system of claim 1, wherein the system comprises a section having four units comprising a first unit, a second unit, a third unit, and a fourth unit, wherein the system is configured such that the first unit and the third unit are activated in unison and the second and fourth unit are activated in unison.

8. The agricultural system of claim 5, wherein there is one second fluid control valve for controlling flow of the second fluid to the connector of all the plurality of units.

9. The agricultural system of claim 5, wherein the system comprises a respective second fluid control valve for controlling flow of the second fluid to each connector.

* * * * *